3,521,481
VALVE LEAK DETECTOR
Felix A. Tyrone, Denver, Colo., assignor to Killam Gas
 Burner Company, Denver, Colo., a corporation of
 Colorado
Filed June 14, 1968, Ser. No. 737,221
Int. Cl. G01m *3/04*
U.S. Cl. 73—40.5                                    8 Claims

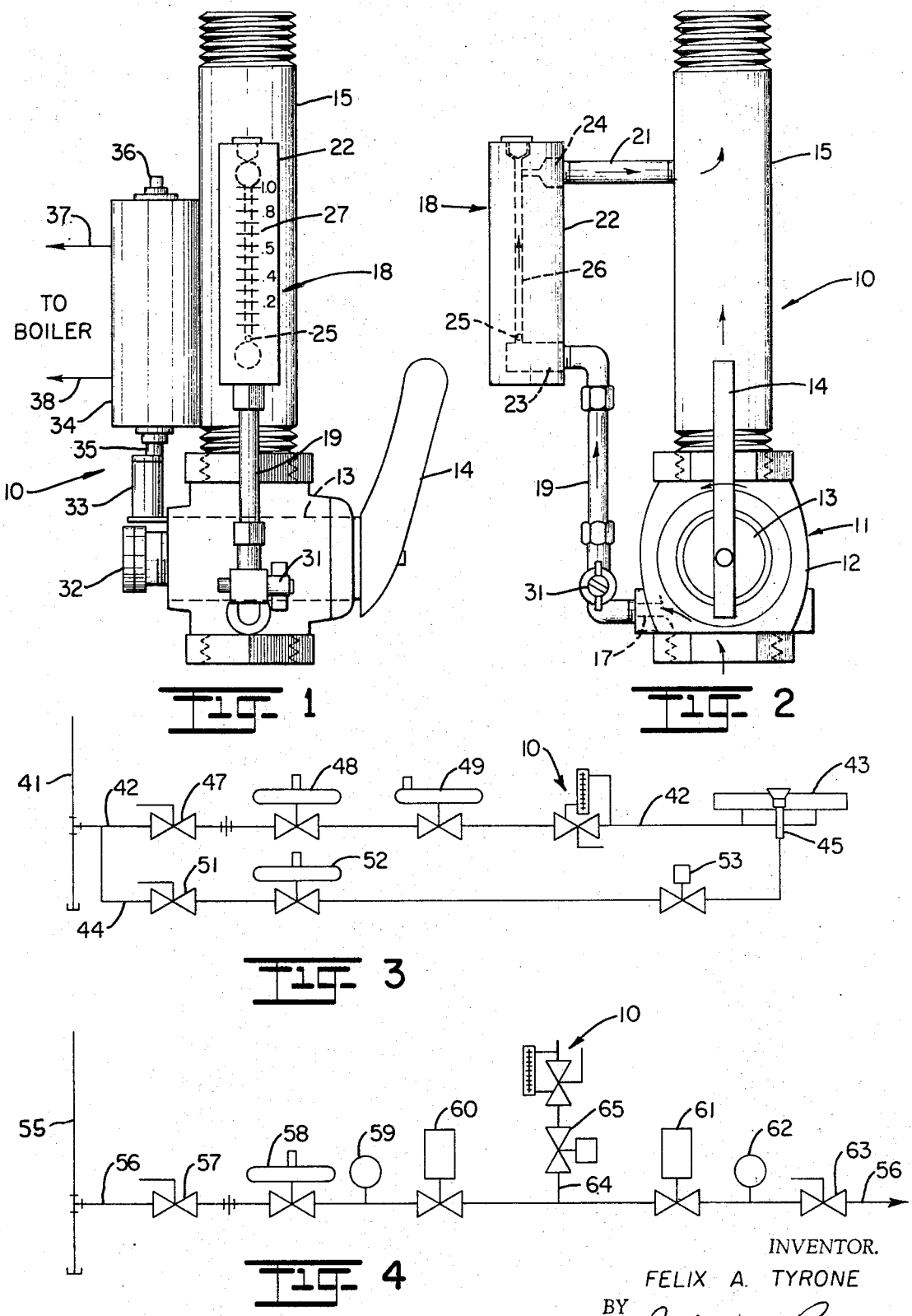

ABSTRACT OF THE DISCLOSURE

A valve leak detector is positioned downstream of one or more valves in a flow line to indicate a leak in any one by closing each valve one at a time. One form of detector for gas includes a cut-off valve arranged for coupling in flow communication with a gas supply line for diverting gas flow from the supply line through a bypass line in parallel with the cut-off valve having a gas flow gauge to provide a visible indication of the presence of small amounts of gas in the line leaking through an upstream closed control valve. The cut-off valve may be disposed in the main supply line or in an auxiliary line.

---

This invention relates to flow line systems and more particularly to a novel and improved device for detecting leaks in closed valves in a flow line.

The need for a reliable safety device which will detect valve leaks in a gas supply line is apparent. In some instances one or several control valves are usually found in a gas supply line between the gas supply and burner and a leak in the valve when it is in a closed position will result in a gas flow through the valve to the burner. Such leaks in the valve and along the line are usually comparatively small in terms of flow rate and may be on the order of $\frac{1}{10}$ of one cubic foot per hour but are stil sufficient to produce a dangerous condition in the gas supply line. The usual practice has been to test the main gas valve for leakage and not the other valves in the gas supply line. Accordingly it is an object of this invention to provide a simple, durable and reliable valve leak detector capable of providing a visible indication of a leak in a closed valve in the line.

Another object of this invention is to provide a novel gas valve leak detector which is easily installed as a part of the conventional gas supply line system and will detect comparatively small leaks in any of the valves located between the gas supply and the gas burner.

It is a further object of this invention to provide a novel and improved gas valve leak detector for a gas supply line which is arranged for mounting in the line so that it may be employed when desired and does not interfere with the normal flow to the burner in a gas supply line.

In accordance with the present invention there is provided a valve leak detector which is located in a flow line having one or more on-off type valves controlling the flow through the line and tests the valves individually for leakage when each is closed. The detector in a preferred form for a gas supply line includes a cut-off valve arranged for connection in the supply line and a bypass in parallel with the cut-off valve having a gas flow gauge therein so that when the cut-off valve is closed leaking gas passing through the closed valve is indicated on the gas flow gauge.

Other objects, advantages and capabilities of the present invention will become apparent as the description proceeds taken in conjunction with the accompanying drawings, in which:

FIG. 1 is a front elevation view of the gas valve leak detector embodying features of the present invention.

FIG. 2 is a side elevation view of the detector shown in FIG. 1.

FIG. 3 is a typical gas supply line system including a main line and a pilot line with the valve leak detector shown downstream of the usual control valves and ahead of the burner in the main line gas flow circuit; and FIG. 4 is a typical gas supply line system wherein the valve leak indicator is positioned downstream of a vent valve with the pilot gas line omitted.

Referring now to the drawings, in FIGS. 1 and 2 there is shown in detail a gas valve leak detector generally designated by numeral 10 constructed as an integral assembly which is readily installed by suitable fittings into a flow line and more particularly a gas supply line system described more fully hereafter with reference to FIGS. 3 and 4. Detector 10 comprises a cut-off valve 11 of the straight flow type including a hollow body 12 enclosing a rotatable plug 13. The plug 13 is of a conventional construction having a passage (not shown) located therein which in the open position aligns with the opening in the hollow body to pass gas. The plug is surmounted by a hand lever 14 which is moved between the open and closed positions to open and close the valve. When the lever 14 is in the upright position as shown the valve is open and when pivoted forwardly through an arc of 90° the valve is closed. Valve body 12 has an internal female threaded portion at each end so that it will connect in a gas supply line and has a pipe section 15 with external threads on each end portion so that its upstream end portion threads into the downstream threads of the valve body and its downstream end portion may be suitably coupled into the gas supply line with another suitable fitting. An outlet passage 17 is formed in the body of the valve upstream of the plug 13 so that when the valve is closed the gas flow in the supply line will be diverted from the valve 11 as is indicated by arrows.

An auxiliary or secondary flow circuit is provided with a line in parallel with the valve 11 which by-passes this valve through passage 17 which in general includes a gas flow gauge 18, an inlet pipe section 19 between the passage 17 and the inlet of the gauge and an outlet pipe 21 between the outlet of the gauge and the pipe section.

The gauge 18 may be of a variety of types suitable for measuring gas flow and the form shown which is particularly suitable for valve leaks includes an elongated body 22 constructed of a transparent material such as plastic having formed therein an inlet 23 at the lower end and an outlet 24 at the upper end. A tapered ball member 25 usually of metal is mounted in a tubular internal passage 26 formed in the body and the ball member will slide vertically in response to a gas flow in the passage. A scale 27 formed or otherwise arranged on a forward surface of the body is provided which is calibrated in progressive increments from bottom to top preferably in 1/10 of one cubic foot per hour to indicate gas flow. In the structural arrangement shown the flow through the inlet pipe 19 and in gauge 18 is controlled by a petcock 31 which threads into the valve body to directly receive air flow from the outlet 17. The inlet pipe 19 has suitable fittings at each end which thread onto the petcock 31 and into the body 22 at inlet 23. The outlet pipe 21 has external threads at each end which thread into the inlet 24 of the body and the pipe section 15.

The inlet and outlet pipes 19 and 21 and the petcock 31 are preferably of a rigid material such as metal and in this manner the indicator 18 is supported from the associated valve body 12 and pipe section 15 to form a unitary assembly. In testing for a valve leak the valves in the supply line ahead of the detector hereafter described are first closed one at a time and the cut-off valve 11 is closed. The petcock 31 is opened so that any gas leak flowing in the supply line will pass through the passage 17, pipe 19 through the indicator passage 26, out pipe 21 and back into the supply line through pipe section 15. A gas flow through the gauge 18 causes the ball member 25 to elevate in accordance with the rate of flow to indicate the presence of the gas leak.

As a safety feature there is also provided an extension 32 on the plug 13 oppositely of lever 14 which supports a trip member or finger 33 located in proximity to an electric switch box 34 mounted on the pipe section 15. The switch box has an actuating button 35 located in proximity to the trip member 33 so that rotation of the lever handle 14 through the upright open position shown trips switch 35. A reset button 36 is mounted on the top of the switch box. Safety switch 34 is interconnected by electrical control lines 37 and 38 into the boiler, not shown, usually operatively associated with the main burner and prevents it from turning on in case the main gas valve 11 is accidentally left closed after a test.

In a typical gas supply line system as is depicted schematically in FIG. 3 for purposes of illustration there is provided a gas supply source 41 which delivers gas through a main supply line 42 to a main burner 43 and through a pilot line 44 to a pilot burner 45. In the main supply line 42 there is provided a main gas valve 47, a main gas pressure regulator valve 48, an automatic main gas valve 49 and a detector 10 as above described downstream of these valves just ahead of the main burner 43. In the pilot line 44 there is shown a pilot gas valve 51, a gas pressure regulator valve 52 and a pilot valve or safety 53.

Referring now to FIG. 4 another form of typical gas supply line system is shown to include a supply source 55 delivering gas to a main supply line 56 with a train of valves in the line including a main gas valve 57, a main gas pressure regulator valve 58, a low gas pressure switch 59, an automatic main gas safety shut-off valve 60, an automatic main gas valve 61, a high pressure gas switch 62 and a checking gas valve 63. In an auxiliary vent line 64 between valves 60 and 61 there is provided a normally open vent valve 65 with the detector 10 above described located in line 64 downstream of vent valve 65. In either of the gas supply line systems shown in FIGS. 3 and 4 the detector device is located downstream of the usual on-off valves which control the gas flow to the main burner. The usual testing procedure is to successively close one of the valves upstream of the detector, shut off the cut-off valve 11 and open the petcock or valve 31. In the event there is any gas flow in the line leaking through the closed valve it will pass through the indicator 18 and will be seen by the elevated position of the ball member 25.

While the present invention has been described with reference to a gas supply line system it is understood that it is applicable to a variety of fluid flow lines having a cut-off valve for shutting off the flow in the line.

Although the present invention has been described with a certain degree of particularity, it is understood that the present disclosure has been made only by way of example and that changes in details of structure and system components may be made without departing from the spirit and scope thereof.

What is claimed is:

1. A gas valve leak detector comprising a normally open cut-off valve adapted for mounting in flow communication with a gas supply downstream of at least one control valve in the supply line, a gas flow indicator arranged in a parallel relation to the cut-off valve to form a secondary bypass gas flow circuit when the cut-off valve and one of the control valves is in a closed position so that a gas leak in the one closed control valve is passed through said indicator.

2. A gas valve leak detector as set forth in claim 1 wherein said secondary gas flow circuit is of substantially lesser flow capacity than the gas supply line and cut-off valve.

3. A gas valve leak detector as set forth in claim 1 wherein said secondary gas flow circuit includes a valve movable to a closed position when the cut-off valve is open.

4. A gas valve leak detector as set forth in claim 1 wherein said gas flow indicator includes an elongated body formed of a transparent material disposed in an upright position and having an internal passage with a ball member slidable in the passage arranged to move in response to a gas flow through said passage.

5. In a flow line system having at least one control valve in the line to open and close the lines to fluid flow, a valve leak detector comprising a cut-off valve in the flow line and a fluid flow indicator in parallel to said cut-off valve to form a secondary by pass fluid flow circuit to detect leaks in said control valve when said control valve and cut-off valves are closed.

6. A gas valve leak detector comprising a normally open cut-off valve adapted for mounting in a flow communication relation with a gas supply line downstream of a plurality of control valves in the supply line, a gas flow indicator having an inlet and outlet and including an elongated body of a transparent material supported in an upright position from the cut-off valve and having an internal passage, a ball member slidable in the passage arranged to move vertically along a scale on the body in response to a gas flow through the passage, a valve controlled pipe for passing gas flow from the upstream side of the cut-off valve into the inlet of the indicator, said pipe being of a rigid material for supporting the indicator body from the cut-off valve, an outlet pipe for passing gas flow from the outlet of the indicator to a rigid pipe section mounted on the outlet of the cut-off valve, said pipe section and said outlet pipe being of a rigid material for supporting the upper portion of an indicator body, so that when the cut-off valve is closed and the valve control pipe is open a gas flow in the supply line and to the indicator is shown on the indicator to detect a leak in the gas supply line.

7. In a gas supply line system including a gas supply, a gas burner, a train of control valves in the supply line including a main gas valve, a main gas pressure regulator valve, and an automatic main gas valve; and a gas valve leak detector in the line downstream of said valves, said gas valve leak detector comprising a cut-off valve mounted in flow communication in the line downstream of said valves, valve controlled pipe means of substantially lesser capacity than the supply line in parallel with the cut-off valve forming the bypass for gas flow around said cut-off valve when the cut-off valve is closed, a gas flow gauge in flow communication with the pipe means for visually indicating gas flow therein when one of the valves is closed and the others are open.

8. In a gas supply line system between a gas supply and a burner and having a train of valves in the line including a main gas valve, a main gas pressure regulator valve, a low gas pressure control, an automatic main gas safety shut-off valve, an automatic main gas valve, a high gas pressure control, and a checking gas valve with a normally open vent valve between the automatic main gas safety shut-off valve and the automatic main gas valve, a gas leak detector in the line downstream of said normally open vent valve said gas leak detector comprising a cut-off valve mounted in flow communication in the line downstream of said vent valve, valve control pipe means of substantially lesser capacity of the supply line forming a bypass for gas around said cut-off valve when the cut-off valve is closed, a gas flow gauge in flow communication with the pipe means for indicating the gas flow therein so that when the gas cut-off valve is closed the valve and the pipe means is open a gas leak in the supply line is indicated by said gauge.

References Cited

UNITED STATES PATENTS

| | | | |
|---|---|---|---|
| 2,908,158 | 10/1959 | Jacobsson | 73—46 |
| 3,295,361 | 1/1967 | Lombardo | 73—40.5 |
| 3,304,546 | 2/1967 | Kern et al. | 73—40.5 |

S. CLEMENT SWISHER, Primary Examiner

W. A. HENRY, Assistant Examiner

U.S. Cl. X.R.

48—193